US011664717B2

(12) United States Patent
Morrison et al.

(10) Patent No.: US 11,664,717 B2
(45) Date of Patent: May 30, 2023

(54) POWER CONVERTER MODULATION SEQUENCE

(71) Applicant: AES Global Holdings PTE Ltd., Singapore (SG)

(72) Inventors: Richard Morrison, Cork (IE); Phelim Bradley, Cork (IE)

(73) Assignee: AES Global Holdings PTE Ltd., Singapore (SG)

( * ) Notice: Subject to any disclaimer, the term of this patent is extended or adjusted under 35 U.S.C. 154(b) by 0 days.

(21) Appl. No.: 17/452,285

(22) Filed: Oct. 26, 2021

(65) Prior Publication Data
US 2023/0131143 A1    Apr. 27, 2023

(51) Int. Cl.
*H02M 1/00* (2006.01)
*H02M 3/00* (2006.01)
*H02M 3/335* (2006.01)
*H02M 1/42* (2007.01)

(52) U.S. Cl.
CPC .......... *H02M 1/0043* (2021.05); *H02M 3/01* (2021.05); *H02M 3/33573* (2021.05); *H02M 1/4241* (2013.01)

(58) Field of Classification Search
CPC ... H02M 3/01; H02M 3/33573; H02M 1/0043
See application file for complete search history.

(56) References Cited

U.S. PATENT DOCUMENTS

| 8,644,035 | B2 | 2/2014 | Pahlevaninezhad et al. |
| 11,201,566 | B2* | 12/2021 | Krumpholz .......... H03K 17/102 |
| 2015/0049515 | A1 | 2/2015 | Zhao et al. |
| 2017/0346410 | A1 | 11/2017 | Halberstadt et al. |
| 2019/0199197 | A1* | 6/2019 | Hamada ................ H02M 1/083 |
| 2021/0067045 | A1* | 3/2021 | Zhang ................... H02M 7/483 |

FOREIGN PATENT DOCUMENTS

| CN | 108964474 A | 12/2018 |
| CN | 109687715 A | 4/2019 |

OTHER PUBLICATIONS

Song, Ji-Woong, et al.; "Comparison of DCM and CCM operated Resonant Converters for High-voltage Capacitor Charger;" IEEE 2013; 6 pages.

(Continued)

*Primary Examiner* — Jue Zhang

(57) ABSTRACT

A power converter includes a transformer, a switching bridge circuit, a resonant tank circuit, an output rectifier, and a controller. The switching bridge circuit includes a plurality of switches, each switch controllable into a conduction mode and into a non-conduction mode. The controller is configured to control the plurality of switches based on a series of phase shift modulation switching cycles, each cycle comprising a control period and a delay period. During the control period, the controller causes the conduction mode of each switch of the plurality of switches to overlap a portion of each conduction mode of two other switches. During the delay period, the controller controls all of the switches into non-conduction modes overlapping in time.

20 Claims, 6 Drawing Sheets

(56) References Cited

OTHER PUBLICATIONS

Song, Ji-Woong, et al.; "Design and Implementation of a 40-kV, 20-kJ/s Capacitor Charger for Pulsed-Power Application;" IEEE Transactions on Plasma Science, vol. 42, No. 11, Nov. 2014; 10 pages.
Guo, Bing, et al.; "Hybrid Control Strategy of Phase-Shifted Full-Bridge LLC Converter Based on Digital Direct Phase-Shift Control," Journal of Power Electronics, vol. 18, No. 3, pp. 802-816, May 2018; 15 pages.
Jang, S.R., et al.; "Novel High Voltage Capacitor Charger for Pulsed Power Modulator," IEEE 2010; 5 pages.

\* cited by examiner

POWER CONVERTER MODULATION SEQUENCE

TECHNICAL FIELD

Aspects of the disclosure relate to power supplies and more particularly to modulation sequences designed to control a power conversion circuit utilizing a resonant circuit.

BACKGROUND

A power supply typically converts an incoming voltage into a different, output voltage. For example, an alternating current (AC) input voltage may be converted to a direct current (DC) voltage for use by electronic equipment. In another example, a first DC input voltage may be converted to a different DC voltage for use by the electronic equipment.

Some high voltage power supply applications include charging a capacitor to a high voltage and using the charged capacitor as a supply to rapidly discharge the stored capacitor energy through a load. An example of such a load includes a pulsed laser. A multi-laser system, the power requirements for each laser may be distinct such that a first laser may operate at a high voltage (e.g., 800 V) while a second laser may operate at a lower voltage (e.g., 200 V). A power supply configured to provide sufficient power to the higher voltage laser may be unable to provide sufficient power to the lower voltage laser. Accordingly, the system can include separate power supplies designed to provide tailored power to a respective laser. However, providing separate power supplies increases cost and real estate/spacing requirements that may be undesirable.

Overview

In accordance with one aspect of the present disclosure, a power converter comprises a transformer, a switching bridge circuit, a resonant tank circuit, an output rectifier, and a controller. The transformer comprises a primary winding coupled to a primary side of the power converter and a secondary winding coupled to a secondary side of the power converter. The switching bridge circuit is on the primary side and comprises a voltage input configured to receive a first voltage and a plurality of switches coupled in a full-bridge arrangement, each switch controllable into a conduction mode and into a non-conduction mode. The resonant tank circuit is on the primary side and coupled to the switching bridge circuit. The output rectifier is coupled to the secondary winding and comprises a voltage output configured to output a second voltage. The controller is configured to control the plurality of switches based on a series of phase shift modulation switching cycles, each cycle comprising a control period and a delay period. During the control period, the controller is configured to cause the conduction mode of each switch of the plurality of switches to overlap a portion of each conduction mode of two other switches of the plurality of switches, wherein the conduction modes of the two other switches do not overlap in time. During the delay period, the controller is configured to control all of the switches into non-conduction modes overlapping in time.

In accordance with another aspect of the present disclosure, a method of operating a power converter including a transformer including a primary winding on a primary side of the transformer and a secondary winding on a secondary side of the transformer, a switching bridge, a resonant tank, an output rectifier, and a plurality of switches coupled between the switching bridge and the resonant tank. The method comprises operating each switch of the plurality of switches during a period of switch conduction of a phase shift modulation sequence into at least one conduction mode duration and into at least one non-conduction mode duration and operating each switch of the plurality of switches during a period of switch non-conduction of the phase shift modulation sequence into overlapping non-conduction mode durations. The at least one conduction mode duration of each switch of the plurality of switches overlaps a portion of the at least one conduction mode duration of two switches of the plurality of switches.

BRIEF DESCRIPTION OF THE DRAWINGS

The drawings illustrate embodiments presently contemplated for carrying out the invention.

In the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
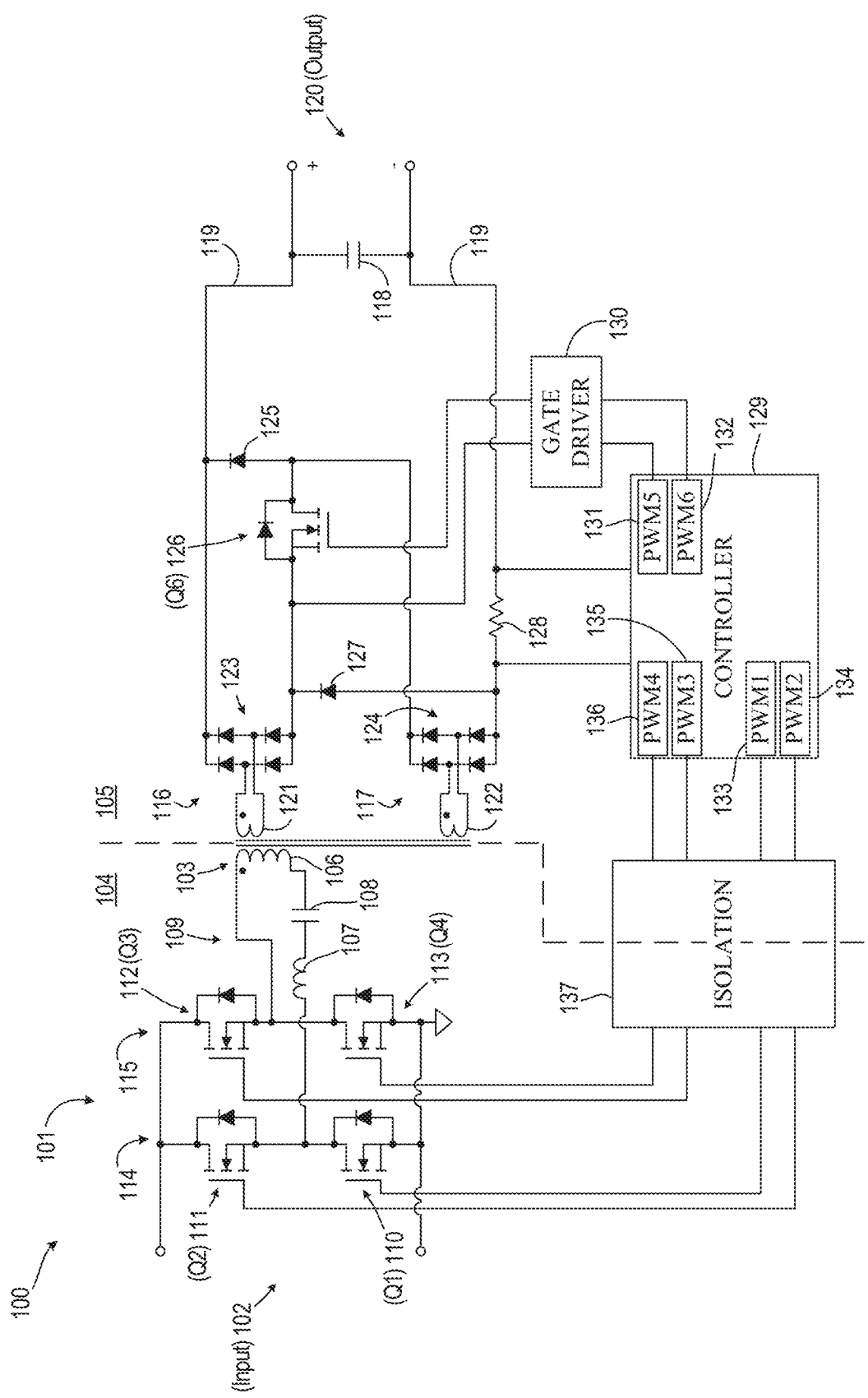
FIG. 1 illustrates a diagram of a full bridge phase-shift power converter according to an embodiment of the present disclosure.

FIG. 1 illustrates a schematic diagram of a full-bridge phase shifted PWM converter 100 according to an embodiment of the present disclosure. The converter 100 includes a switching bridge circuit 101 coupled to a voltage input 102 configured to receive a DC voltage. A transformer 103 has a primary side 104 and a secondary side 105. The primary side 104 includes a primary winding 106 coupled with an inductor 107 and capacitor 108 that form a series resonant tank 109 coupled to the switching bridge circuit 101. The switching bridge circuit 101 includes four switches (e.g., MOSFETs) 110, 111, 112, 113. The first switch (Q1) 110 and the second switch (Q2) 111 form the leading leg 114 of the switching bridge circuit 101 while the third switch (Q3) 112 and the fourth switch (Q4) 113 form the lagging leg 115 of the switching bridge circuit 101. The second switch (Q2) 111 and the third switch (Q3) 112 are high-side switches of the respective legs 114, 115 while the first switch (Q1) 110 and the fourth switch (Q4) 113 are the low-side switches. Through phase shift modulation control of the switches 110-113 described herein, the switching bridge circuit 101 stimulates the resonant tank 109 with a multi-level voltage signal. In response, a sinusoidal current can be produced through the primary winding 106.

FIG. 1 illustrates a pair of output stages 116, 117 of a two-winding series-parallel charging system for an energy storage capacitor 118 coupled across an output bus 119 on the secondary side 105 of the transformer 103. A voltage output 120 coupled to the output bus 119 delivers energy stored in the energy storage capacitor 118 or energy output directly from the output stage 116, 117. Each output stage 116, 117 includes a secondary winding 121, 122 inductively coupleable to the primary winding 106 and coupled to an output rectifier 123, 124 for rectifying the sinusoidal current generated in the secondary winding 121. The positive output of the second output rectifier 124 is connected to the anode of a first diode 125 and to one side of a controllable series/parallel switch (Q6) 126. The negative output of the second output rectifier 124 is connected directly to the anode of a second diode 127 and indirectly to the negative side of the energy storage capacitor 118 via a sense resistor 128. The positive output of the first output rectifier 123 is connected directly to the cathode of the first diode 125 and to the positive side of the energy storage capacitor 118. The negative output of the first output rectifier 123 is connected to the cathode of the second diode 127 and to the other side of the series/parallel switch (Q6) 126.

A controller 129 coupled to the sense resistor 128 monitors the output bus 119 and commands a gate driver 130 to control the series/parallel switch (Q6) 126 into a conduction mode or a non-conduction mode based on a comparison of the level of the voltage across the output bus 119 with a threshold voltage level. The controller 129 includes a pair of pulse-width modulation (PWM) outputs 131, 132 (PWM5, PWM6 as illustrated) for controlling the gate of the series/parallel switch (Q6) 126 to turn the switch 126 on or off. When the series/parallel switch (Q6) 126 in the non-conduction (or off) mode, the output rectifiers 123, 124 are connected in parallel. When the series/parallel switch (Q6) 126 in the conduction (or on) mode, the output rectifiers 123, 124 are connected in series. In one embodiment, the threshold voltage is set to about half of the rated output voltage of the converter 100 supplied at the voltage output 120. The controller 129 may then cause the gate driver 130 to control the series/parallel switch (Q6) 126 into the non-conduction mode if the voltage measured across the output bus 119 is less than the voltage threshold. In other embodiments, the threshold voltage may be set to higher or lower values.

The controller 129 also includes PWM outputs 133-136 (e.g., PWM1, PWM2, PWM3, PWM4) for sending control signals to respective switches 110-113. An isolation device 137 coupled between the controller 129 and switches 110-113 provides transmission of the control signals between the primary side 104 and secondary side 105 of the transformer 103. The isolation device 137 may isolate the primary and secondary sides 104, 105 via one or more isolation devices such as isolation transformers, opto-couplers, etc. in an example.

Figure 2:
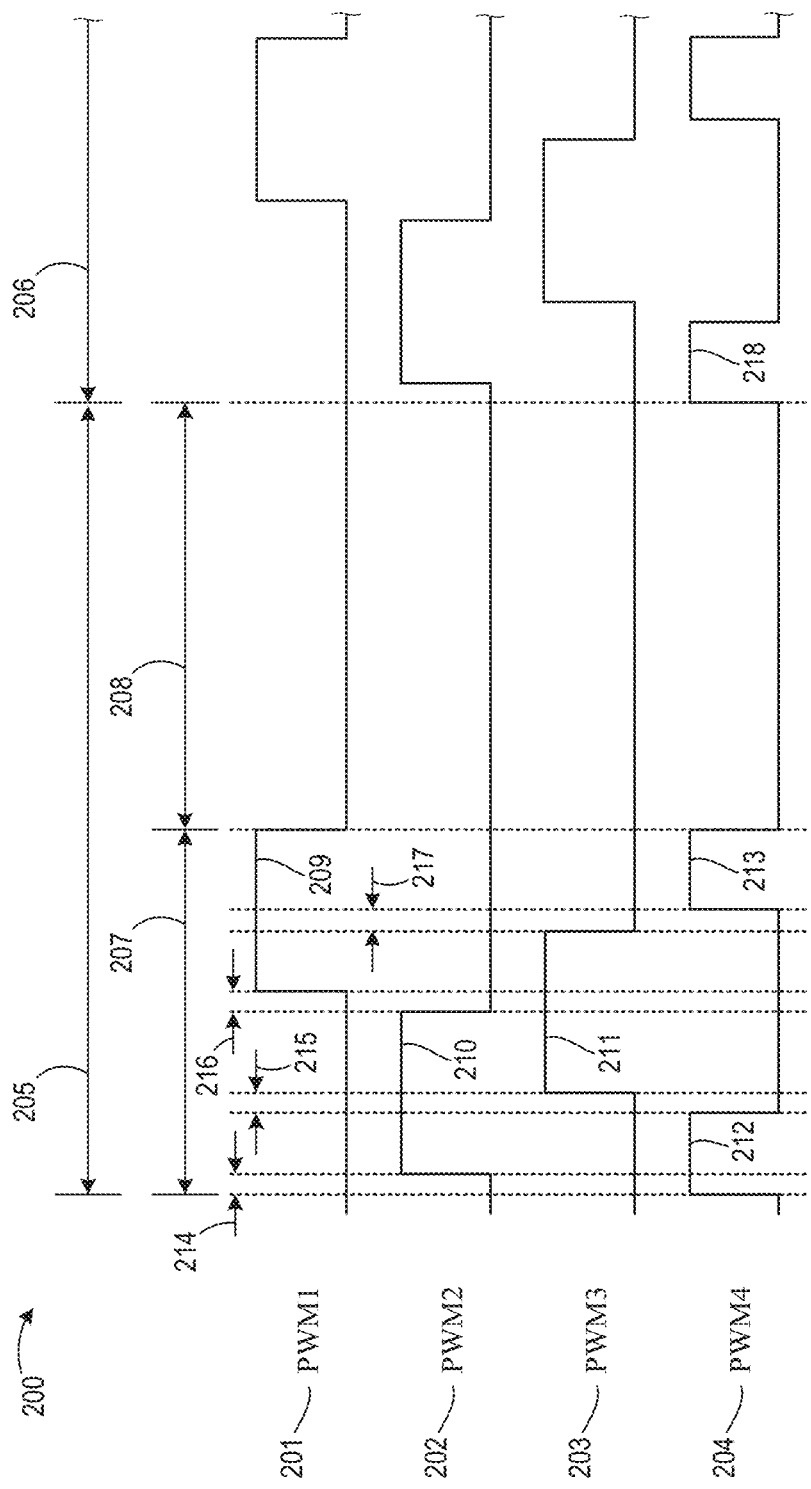
FIG. 2 illustrates the gate pulses for the converter in FIG. 1 according to an embodiment of the present disclosure.

FIG. 2 illustrates a switch modulation sequence 200 for the switches 110-113 (Q1-Q4) of the converter in FIG. 1 according to an embodiment of the present disclosure. A plurality of gate pulse sequences 201-204 generated by the controller 129 of FIG. 1 and output by the PWM outputs 133-136 control the respective switches 110-113 into their conduction or non-conduction modes for controlling power supplied to the resonant tank 109.

The switch modulation sequence 200 includes one or more phase-shifted gate drive switching cycles 205, 206. Each cycle includes a control period 207 and a delay period 208. During the control period 207, each gate pulse sequence 201-204 includes one or more pulses 209-213 configured to control a respective switch 110-113 into its conduction mode. Outside of the pulses 209-213 during the control period 207, gate pulse sequences 201-204 control their respective switches 110-113 into their non-conduction modes. The control period 207 begins with the start of the first pulse (e.g., pulse 212) of the gate pulse sequences 201-204 and finishes with the end of the last pulse or pulses (e.g., pulse 209, pulse 213, or both pulses 209 and 213). During the control period 207, it is contemplated that there is always at least one switch 110-113 being controlled into its conduction mode. While no switch 110-113 is conducting during the entire control period 207, due to the overlap of the pulses 209-213, at least one of the switches 110-113 is conducting at each point during the control period 207.

The PWM4 gate pulse sequence 204 includes two pulses 212, 213 in the control period 207 for controlling the fourth switch (Q4) 113 into its conduction mode. The first pulse 212 begins the control period 207 as illustrated in FIG. 2, and the second pulse 213 is positioned to finish the control period 207 or to end near the finish of the control period 207. Following a dead time 214 from the start of the first pulse 212, the PWM2 gate pulse sequence 202 begins its single pulse 210 for controlling the second switch (Q2) 111 into its conduction mode. The pulse 212 terminates, and the single pulse 211 of the PWM3 gate pulse sequence 203 starts during the pulse 210 of the PWM2 gate pulse sequence 202. The pulse 211 is separated from the pulse 212 by a second dead time 215. During the pulse 211, the pulse 210 terminates, and the single pulse 209 of the PWM1 gate pulse sequence 201 begins after a third dead time 216. The pulse 211 terminates, and the second pulse 213 of the PWM4 gate pulse sequence 204 starts during the pulse 209 after a fourth dead time 217. As illustrated, the pulses 209, 213 may be designed to terminate simultaneously. However, it is contemplated that one of the pulses 209, 213 may end before the other pulse. As stated above, the termination of the last pulse (e.g., pulses 209 and/or 213) ends the control period 207. The dead times 214-217 may be identical time periods, or one or all may be distinct from the others. During the dead times 214-217 and during any dead time (not shown) following the penultimate pulse 209 or 213 if the pulses 209 and 213 are not terminated simultaneously, only a single switch 110-113 is controlled into its conduction mode while the other switches are controlled into their non-conduction modes. Outside of the dead times 214-217, two of the switches 110-113 are controlled into their conduction modes while the other two switches are controlled into their non-conduction modes. Thus, during the control period 207, no more than three switches of the four switches 110-113 are simultaneously controlled into their non-conduction modes.

As illustrated in FIG. 2, each conduction control pulse 209-213 of the gate pulse sequences 201-204 overlaps a portion of at least one other control pulse 209-213 controlling another switch 110-113. Each control pulse 209-211 of the gate pulse sequences 201-203 overlaps a portion of two other control pulses. For example, the pulse 209 overlaps a portion of the pulse 211 and a portion of the pulse 213. In the case of the pulse 213, the pulse 209 may overlap the entire pulse 213 in one embodiment. The pulse 210 overlaps a portion of the pulse 211 and overlaps a portion of the pulse 212. The overlapping portions of the control pulses 209-213 cause the conduction mode of each switch 110-113 to overlap a portion of each conduction mode of two other switches 110-113. The conduction mode of the first switch (Q1) 110 overlaps a first portion of the conduction mode of the third switch (Q3) 112 and a first portion of the conduction mode of the fourth switch (Q4) 113. The conduction mode of the second switch (Q2) 111 overlaps a second portion of the conduction mode of the third switch (Q3) 112 and a second portion of the conduction mode of the fourth switch (Q4) 113. As indicated in the gate pulse sequences 201-202, the first switch (Q1) 110 and the second switch (Q2) 111 are alternately controlled into their conductive modes to avoid a short circuit across the voltage input 102. Similarly, the third switch (Q3) 112 and the fourth switch (Q4) 113 are alternately controlled into their conductive modes. Thus, no portion of the conduction mode of the first switch (Q1) 110 overlaps the conduction mode of the second switch (Q2) 111, and no portion of the conduction mode of the third switch (Q3) 112 overlaps the conduction mode of the fourth switch (Q4) 113.

The delay period 208 that follows the control period 207 simultaneously controls each switch 110-113 into its non-conduction mode. The delay period 208 lacks any pulse configured to turn any switch 110-113 into its conduction mode. The delay period 208 terminates at the end of the cycle 205, and a subsequent cycle (e.g., cycle 206) may begin with the application of a first pulse 218 as described above. During the delay period or interval 208, all the primary switches 110-113 are turned off with no flux excitation in the transformer 103. The division of the PWM4 gate pulse sequence 204 into the two pulses 212, 213 helps to keep the stimulation balanced.

Figure 3:
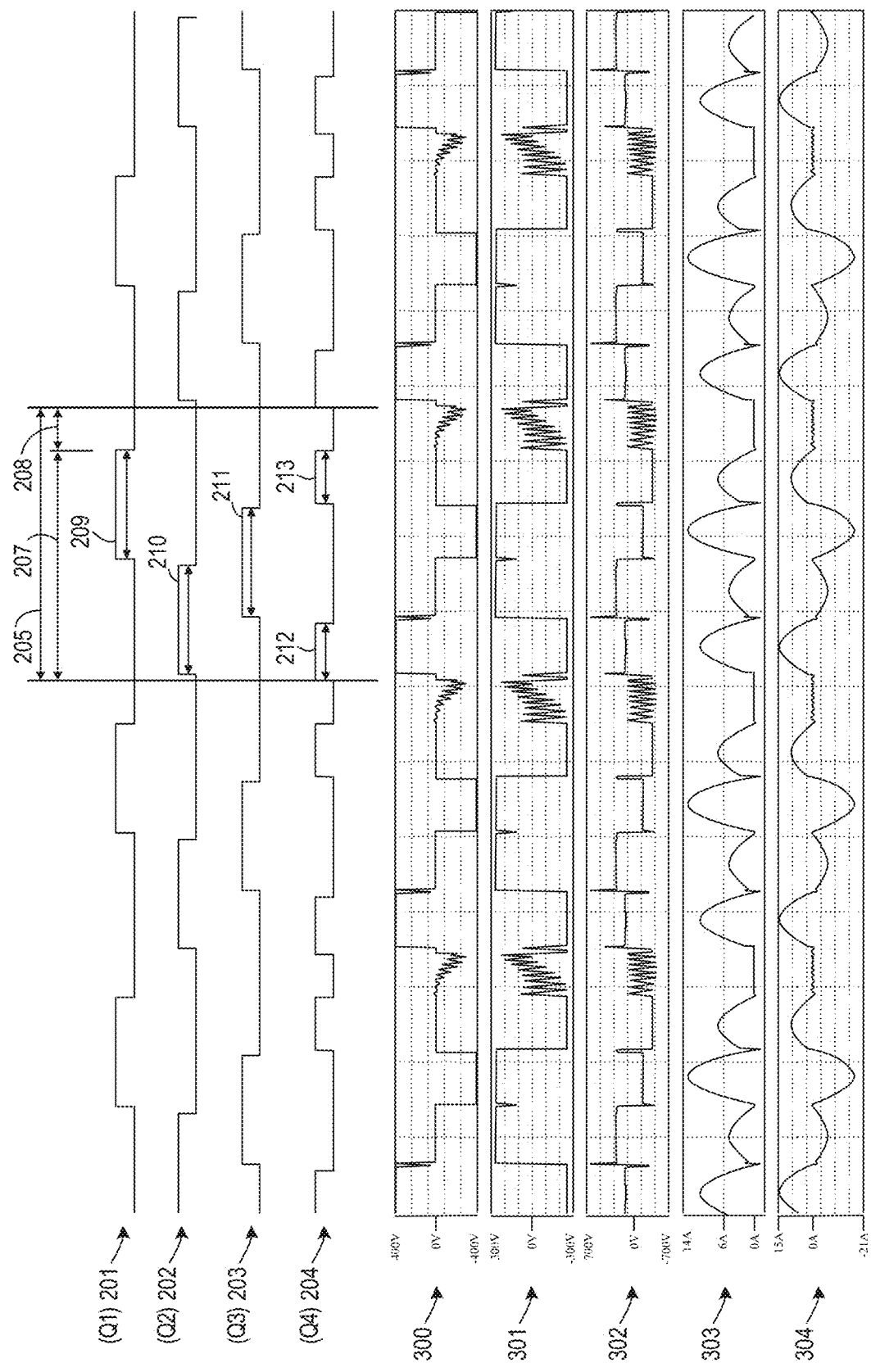
FIG. 3 illustrates simulated results for the converter of FIG. 1 executing the gate pulses of FIG. 2 at a first time delay according to an example.

FIG. 3 illustrates application of the switch modulation sequence 200 of FIG. 2 with simulated circuit waveforms according to an example. In addition to the gate pulse sequences 201-204, FIG. 3 illustrates a plurality of waveforms 300-304 showing simulated voltage and current responses in the converter 100 of FIG. 1. In the example of FIG. 3, the width of the pulses 209-211 is set to the resonant period, T, of the resonant tank 109, which may be set according to the formula:

$$T = 2\pi\sqrt{LC} \quad \text{(Eqn. 1)}$$

where L is the inductance of the inductor 107 and C is the capacitance of the capacitor 108. The conduction time of the fourth switch (Q4) 113 is split among the pulses 212, 213, and the conduction time, $T_\varphi$, of the first pulse 212 may be set to half of the resonant period, T, in the example shown according to the formula:

$$T_\varphi = \pi\sqrt{LC} \quad \text{(Eqn. 2)}.$$

The length of the second pulse 213 is set to $T-T_\varphi$. Setting the switch on-times of the switches 110-112 via the pulses 209-211 to the resonant period, T, and the phase shift to half the resonant period provides near zero current primary switching at turn-on and turn-off for output voltages reflected to the primary above about 20% of the input voltage. Accordingly, resulting switching losses are low.

As illustrated in FIG. 3, the voltage waveform 300 (corresponding with the bridge voltage) results in a three-level voltage stimulation of the resonant tank 109 via the phase-shifted gate drive modulation sequence 200. The three-level voltage stimulation adds an additional voltage level relative to a variable frequency zero current switching push/pull PWM sequence known in the art that includes simultaneously switching on and off a first pair of switches formed by the high-side leading leg switch (e.g., second switch (Q2) 111) and the low-side lagging leg switch (e.g., fourth switch (Q4) 113) in an alternating manner to that of simultaneously switching on and off a second pair of switches formed by the high-side lagging leg switch (e.g., third switch (Q3) 112) and the low-side leading leg switch (e.g., first switch (Q1) 110). In addition, during the intervals of the modulation sequence 200 when both upper or both lower switches (e.g., switches 110/113 or switches 111/112) are turned on, which may be referred to as free-wheeling intervals, the input bus is decoupled from the resonant tank 109, and only the output voltage that is reflected to the primary winding 106 is applied to the resonant tank 109.

In FIG. 3, the waveform 300 corresponds with a voltage between the half bridge legs (e.g., between the drains of Q1 110 and Q4 113). The waveform 301 corresponds with a voltage of the primary winding 106 of the transformer 103, and the waveform 302 corresponds with a voltage of the resonant tank 109 (e.g., between the node at the drain of 100 (Q1) and the node connecting the capacitor 108 to the primary winding 106). The current waveform 303 corresponds with the output current, and the current waveform 304 corresponds with the current of the resonant tank 109.

Figure 4:
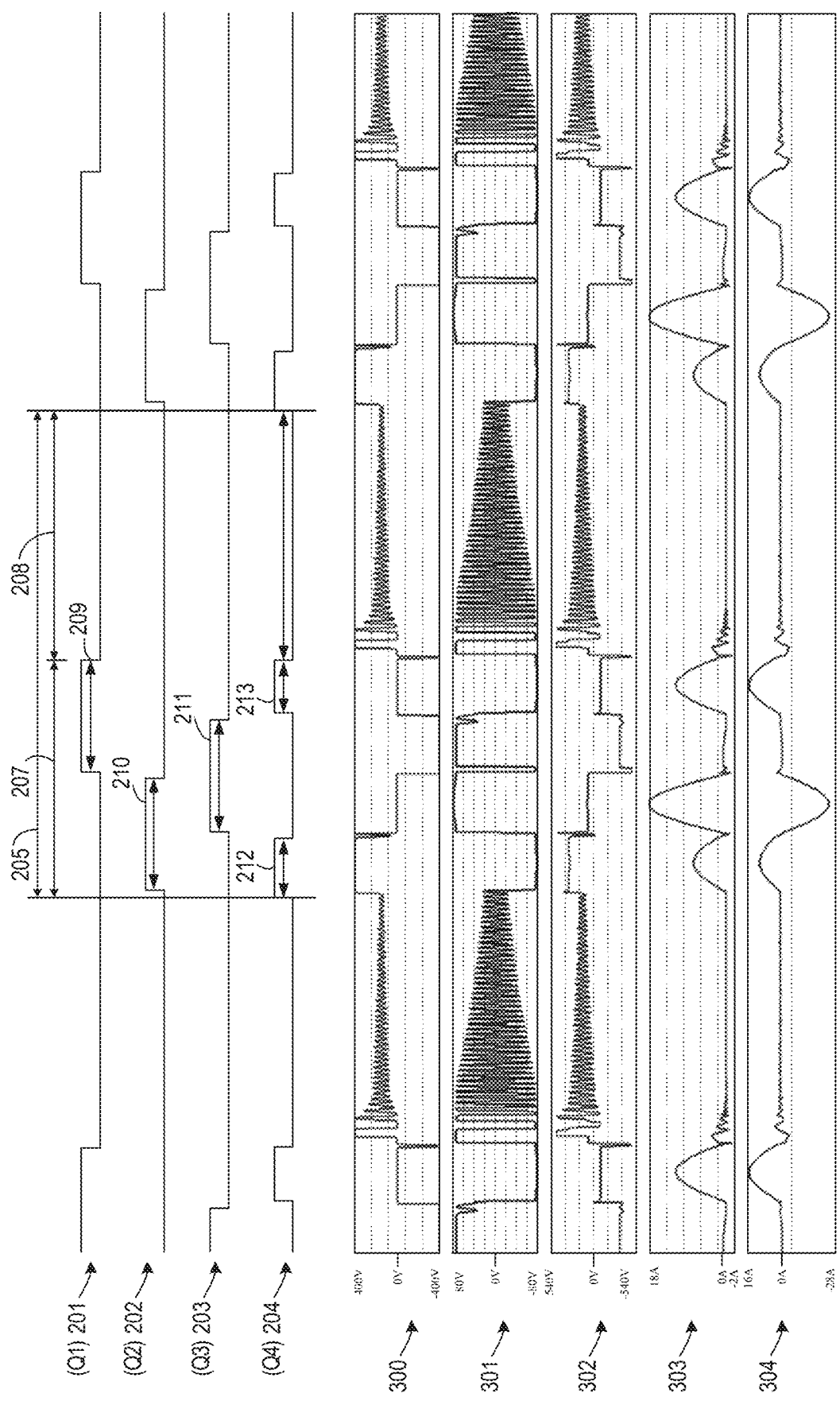
FIG. 4 illustrates simulated results for the converter of FIG. 1 executing the gate pulses of FIG. 2 at a second time delay according to another example.

The output voltage level of the converter 100 can be increased or decreased, in one method, by changing the delay between switching cycles, which adjusts the operating frequency of the converter 100. The length of the execution time of the delay period 208 is based at least in part on the desired output voltage of the converter 100. Thus, the execution of a consecutive control periods 207 separated by the delay period 208 affects the output voltage. For example, FIG. 4 illustrates a longer delay period 208 than the delay period 208 of FIG. 3. The corresponding waveforms 300-304 illustrate a decreased output voltage level and a decreased operating frequency compared with the output voltage level shown in FIG. 3.

As explained above, application of a phase-shifted gate drive modulation sequence according to this disclosure where the lengths of the pulses 209-211 are set based on the resonant frequency of the resonant tank 109 and the phase delay, $T_\varphi$, is set based on half of the resonant frequency can yield a near-zero current primary switching at turn-on and turn-off for output voltages reflected to the primary above about 20%. For output voltages below about 20%, one or more currents in the converter 100 may approach or surpass undesirable high levels. Accordingly, the variable delay, fixed phase shift modulation sequence described herein may be substituted for a control sequence that reduces such currents.

Figure 5:
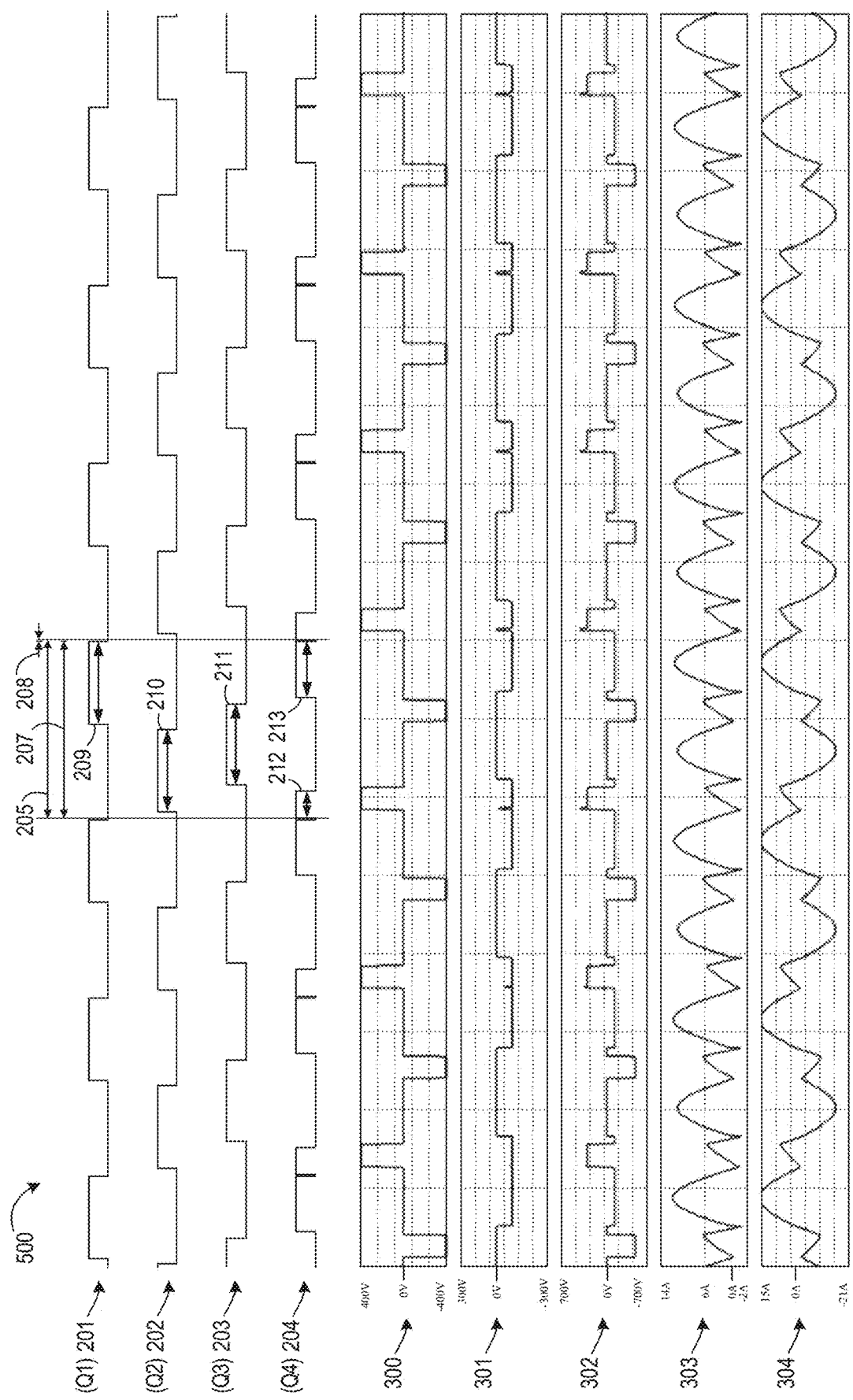
FIG. 5 illustrates simulated results for the converter of FIG. 1 executing the gate pulses of FIG. 2 at a third time delay according to another example.

FIG. 5 illustrates a modified phase-shifted gate drive modulation sequence 500 useful for output voltages below about 20%. As shown, the delay period 208 can be reduced to zero or near-zero values, and the length, $T_\varphi$, of the pulse 212 may be reduced as well to shorten the phase delay. Note that in this scheme, the duration of 212 is less than the duration of 213, and the sum of their durations is equal to that of 211. The durations of 209-211 are equal. The lengths of the pulses 209-211 are also shortened to be less than the resonant frequency of the resonant tank 109. The reduction in the phase delay can lead to hard switching of the switches 110-113. Using silicon carbide-based switches (e.g., SiC MOSFETs) for the controllable power switches 110-113 can support such hard switching without incurring excessive losses. Application of the modified phase-shifted gate drive modulation sequence 500 can keep the tank impedance high. The shortening of the delay period 208 compared with that of FIG. 3 increases output voltage level and increases the operating frequency.

As described above, the pair of output stages 116, 117 may be connected in a parallel relationship or in a series relationship. For output voltage levels of the converter 100 less than about half of the rated output voltage of the converter 100, the series/parallel switch (Q6) 126 can be controlled into the non-conduction (or off) mode so that the output rectifiers 123, 124 are connected in parallel. For output voltage levels greater than about half of the rated output voltage of the converter 100, the series/parallel switch (Q6) 126 can be controlled into the conduction (or on) mode so that the output rectifiers 123, 124 are connected in series. For output voltage levels around or near about half of the rated output voltage of the converter 100, the output voltage may experience a dip. One way to address such a dip may be to lower an impedance of the inductor 107 of the resonant tank 109. However, peak currents throughout the converter 100 increase as a result.

Figure 6:
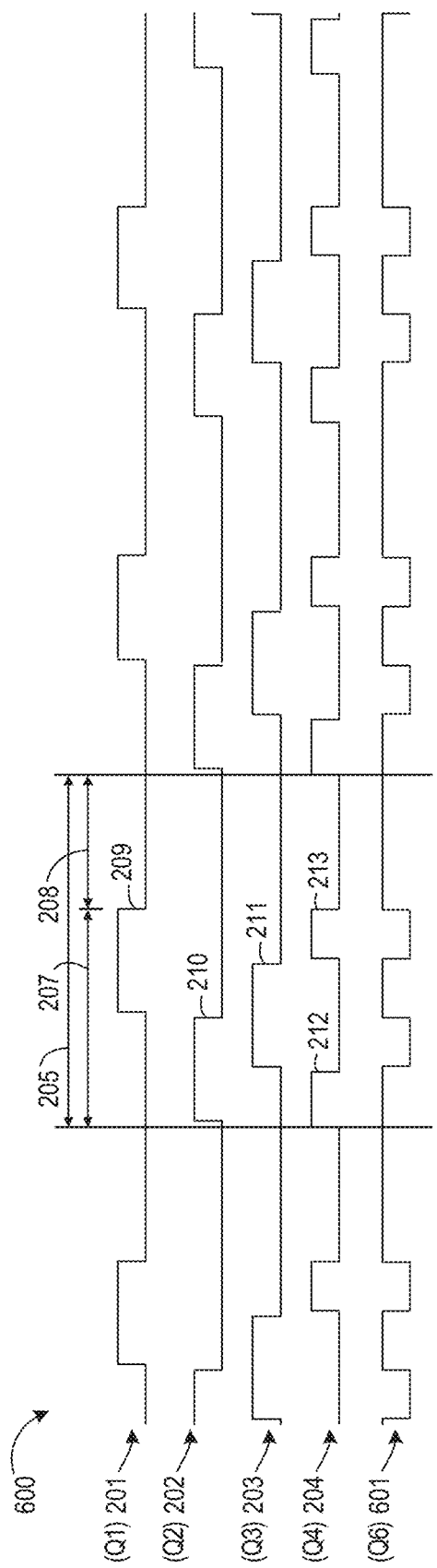
FIG. 6 illustrates the gate pulses for the converter of FIG. 1 according to another embodiment of the present disclosure.

Another way to address the dip is illustrated in FIG. 6, which shows an alternative control sequence 600 incorporating the switch modulation sequence 200 together with an alternating on/off control of the series/parallel switch (Q6) 126 according to an embodiment. During the cycle 205, the series/parallel switch (Q6) 126 is controlled by a gate pulse sequence 601 that controls the switch 126 into its conducting mode (or on state) during the intervals outside the free-wheeling intervals (e.g., free-wheeling intervals where the switches 110/113 or switches 111/112 are simultaneously turned on) and into its non-conducting mode (or off state) during the free-wheeling intervals. As a result, peak currents in the primary winding 106 surge to bring the output voltage to a higher level, which can equalize the output voltage to the desired level.

Figure 7:
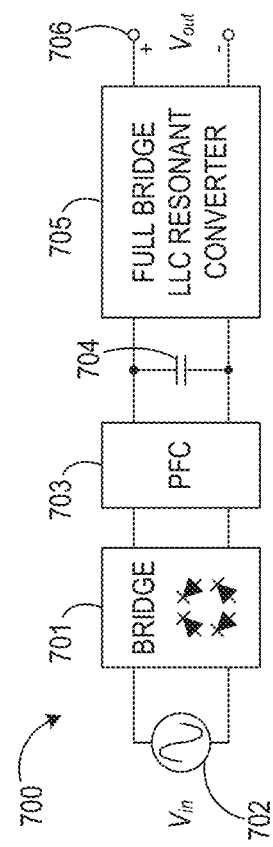
FIG. 7 illustrates a diagram of a power supply incorporating the converter of FIG. 1 according to an example.

A power supply 700 incorporating the converter 100 and one or more of the modulation sequences 100, 500 disclosed herein is illustrated in FIG. 7 according to an embodiment. The voltage converter 700 is an AC-to-DC converter including a voltage rectification bridge 701 configured to convert incoming AC voltage from an AC voltage source 702 into a first DC voltage. A power factor correction (PFC) block 703 corrects a power factor of the first DC voltage and provides a second DC voltage for charging a bulk capacitor 704. A DC-to-DC converter 705 converts the second DC voltage into an output voltage supplied by a voltage output 706. The DC-to-DC converter 705 may include the full-bridge LLC resonant converter 100 described herein.

The application of the disclosed variable delay, fixed phase shift modulation sequence to the series resonant converter 100 of FIG. 1 where the reflected output voltage is greater than the input voltage/2 enables the peak tank energy to be reduced by a factor of three relative to the conventional push-pull variable frequency modulation strategy without free-wheeling intervals. Thus, the space occupied by the series resonant tank can be significantly reduced by using alternate components. For example, the choke can be realized using a RM12 ferrite core, and the peak voltage rating of the capacitor can be reduced from 800V to 500V.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the invention is not to be seen as limited by the foregoing description but is only limited by the scope of the appended claims.

What is claimed is:

1. A power converter comprising:
    a transformer comprising:
        a primary winding coupled to a primary side of the power converter; and
        a secondary winding coupled to a secondary side of the power converter;
    a switching bridge circuit on the primary side and comprising:
        a voltage input configured to receive a first voltage; and
        a plurality of switches coupled in a full-bridge arrangement, each switch controllable into a conduction mode and into a non-conduction mode;
    a resonant tank circuit on the primary side and coupled to the switching bridge circuit;
    an output rectifier coupled to the secondary winding and comprising a voltage output configured to output a second voltage; and
    a controller configured to:
        control the plurality of switches based on a series of phase shift modulation switching cycles, each cycle comprising a control period and a delay period;
        wherein, during the control period, the controller is configured to cause the conduction mode of each switch of the plurality of switches to overlap a portion of each conduction mode of two other switches of the plurality of switches, wherein the conduction modes of the two other switches do not overlap in time; and
        wherein, during the delay period, the controller is configured to control all of the switches into non-conduction modes overlapping in time.

2. The power converter of claim 1, wherein the control period begins in response to controlling one of the switches into the conduction mode and ends in response to each switch being simultaneously controlled into the non-conduction mode.

3. The power converter of claim 1, wherein the series of phase shift modulation switching cycles comprises a first cycle and a second cycle; and
    wherein the controller is further configured to:
        execute the control period of the first cycle;
        execute the delay period of the first cycle after the control period of the first cycle; and
        execute the control period of the second cycle after the delay period of the first cycle.

4. The power converter of claim 3, wherein the controller is further configured to base an execution time of the delay period on a desired value of the second voltage.

5. The power converter of claim 4, wherein, in response to the execution time of the delay period being set to a first duration, the power converter is configured to output the second voltage at a first value; and wherein, in response to the execution time of the delay period being set to a second duration longer than the first duration, the power converter is configured to output the second voltage at a second value less than the first value.

6. The power converter of claim 1, wherein the resonant tank circuit comprises:
a resonant tank inductor; and
a resonant tank capacitor;
wherein the resonant tank inductor, the resonant tank capacitor, and the primary winding of the transformer are coupled in series.

7. The power converter of claim 6, wherein the plurality of switches comprises a first switch, a second switch, a third switch, and a fourth switch;
wherein, during the control period, the controller is further configured to:
control each of the first, second, and third switches into a single conduction mode period and into at least one non-conduction mode period; and
control the fourth switch into a pair of conduction mode periods and into at least one non-conduction mode period.

8. The power converter of claim 7, wherein, during the control period, the controller is further configured to set a duration of the single conduction mode period of each of the first, second, and third switches equal to a resonant frequency of the resonant tank circuit in response to the second voltage being greater than twenty percent of the first voltage.

9. The power converter of claim 7, wherein, during the control period, the controller is further configured to set a duration of the single conduction mode period of each of the first, second, and third switches less than a resonant frequency of the resonant tank circuit in response to the second voltage being less than twenty percent of the first voltage.

10. The power converter of claim 7, wherein the first and second switches form a first leading leg;
wherein the third and fourth switches form a lagging leg; and
wherein the second and third switches are high-side switches.

11. A method of operating a power converter including a transformer including a primary winding on a primary side of the transformer and a secondary winding on a secondary side of the transformer, a switching bridge, a resonant tank, an output rectifier, and a plurality of switches coupled between the switching bridge and the resonant tank, the method comprising:
operating each switch of the plurality of switches during a period of switch conduction of a phase shift modulation sequence into at least one conduction mode duration and into at least one non-conduction mode duration; and
operating each switch of the plurality of switches during a period of switch non-conduction of the phase shift modulation sequence into overlapping non-conduction mode durations;
wherein the at least one conduction mode duration of each switch of the plurality of switches overlaps a portion of the at least one conduction mode duration of two switches of the plurality of switches.

12. The method of claim 11, further comprising:
operating the plurality of switches based on a series of switching cycles, each switching cycle comprising the phase shift modulation sequence; and
adjusting an operating frequency of the power converter based on a duration of the period of switch non-conduction between consecutive switching cycles.

13. The method of claim 12, wherein adjusting the operating frequency comprises shortening the duration of the period of switch non-conduction to increase the operating frequency of the power converter.

14. The method of claim 12, wherein adjusting the operating frequency comprises shortening the duration of the period of switch non-conduction to increase a power output of the power converter.

15. The method of claim 12, wherein adjusting the operating frequency comprises lengthening the duration of the period of switch non-conduction to decrease the operating frequency of the power converter.

16. The method of claim 12, wherein adjusting the operating frequency comprises lengthening the duration of the period of switch non-conduction to decrease the power output of the power converter.

17. The method of claim 11, wherein the plurality of switches comprises four switches coupled in a full-bridge arrangement; and
wherein, during the period of switch conduction, no more than three switches of the four switches are simultaneously controlled into the non-conduction mode.

18. The method of claim 17, wherein the full-bridge arrangement comprises:
a first high-side switch in a leading leg;
a first low-side switch in the leading leg;
a second high-side switch in a lagging leg; and
a second low-side switch in the lagging leg;
wherein the at least one conduction mode duration of the first high-side switch overlaps the portion of the at least one conduction mode duration of the second high-side switch and overlaps the portion of the at least one conduction mode duration of the second low-side switch.

19. The method of claim 18, wherein the at least one conduction mode duration of the first high-side switch does not overlap any portion of the at least one conduction mode duration of the first low-side switch.

20. The method of claim 18 further comprising
setting a duration of the at least one conduction mode duration of each of the first high-side switch, the first low-side switch, and the second high-side switch equal to a resonant frequency of the resonant tank; and
setting a duration of a first conduction mode duration of the at least one conduction mode duration of the second low-side switch equal to half of the resonant frequency.

* * * * *